US006930715B1

(12) United States Patent
Mower

(10) Patent No.: US 6,930,715 B1
(45) Date of Patent: Aug. 16, 2005

(54) METHOD, SYSTEM AND PROGRAM PRODUCT FOR AUGMENTING AN IMAGE OF A SCENE WITH INFORMATION ABOUT THE SCENE

(75) Inventor: James E. Mower, Altamont, NY (US)

(73) Assignee: The Research Foundation of the State University of New York, Albany, NY (US)

( * ) Notice: Subject to any disclaimer, the term of this patent is extended or adjusted under 35 U.S.C. 154(b) by 799 days.

(21) Appl. No.: 09/621,513

(22) Filed: Jul. 21, 2000

(51) Int. Cl.[7] .......................................... H04N 5/262
(52) U.S. Cl. ............................... 348/239; 348/207.99
(58) Field of Search ........................... 701/208, 201, 701/207; 345/247; 348/148, 239, 207.99

(56) References Cited

U.S. PATENT DOCUMENTS

| | | | |
|---|---|---|---|
| 4,940,972 A | 7/1990 | Mouchot et al. | 340/747 |
| 4,970,666 A | 11/1990 | Welsh et al. | 345/423 |
| 5,467,271 A | 11/1995 | Abel et al. | 702/5 |
| 5,528,518 A | 6/1996 | Bradshaw et al. | 702/150 |
| 5,544,052 A | 8/1996 | Fujita et al. | 702/5 |
| 5,721,679 A | 2/1998 | Monson | 701/207 |
| 5,798,923 A | 8/1998 | Laskowski | 702/5 |
| 5,812,962 A | 9/1998 | Kovac | 701/208 |
| 5,848,373 A | 12/1998 | DeLorme et al. | 701/200 |

Primary Examiner—Tuan Ho
Assistant Examiner—Heather R. Long
(74) Attorney, Agent, or Firm—Wayne F. Reinke, Esq.; Heslin Rothenberg Farley & Mesiti P.C.

(57) ABSTRACT

A fixed or mobile image capturing device, coupled to a first computer, is remotely controlled over a global computer network by a second computer, and obtains a digital image of a scene. The first computer acquires a digital elevation model of the scene, which is data for creating a three-dimensional perspective model of the scene in two dimensions based on data corresponding, and registers the image with the digital elevation model. The registered digital image is provided to the second computer over the global computer network. When a user at the second computer points to an area of the registered image, the first computer augments the image provided with at least some information corresponding to the area pointed to.

54 Claims, 4 Drawing Sheets

METHOD, SYSTEM AND PROGRAM PRODUCT FOR AUGMENTING AN IMAGE OF A SCENE WITH INFORMATION ABOUT THE SCENE

STATEMENT AS TO RIGHTS UNDER FEDERALLY SPONSORED RESEARCH

This invention was made with Government support under National Science Foundation Contract No. DUE 9851437. Accordingly, the Government has certain rights in this invention.

BACKGROUND OF THE INVENTION

1. Technical Field

The present invention generally relates to imaging. More particularly, the present invention relates to augmenting an image of a scene with information about the scene.

2. Background Information

In the past, workers in the field, hikers and others have had to navigate unfamiliar terrain using a map. Faced with a map and a view of the terrain in the field, the user tries to understand the environment with the map as his model, gradually developing a cognitive transformation with elements of three-dimensional rotation, perspective scale foreshortening, and hidden surface construction. Under the best viewing conditions, users differ sharply in their ability to interpret maps and orient them to their environment. As conditions degrade, even the most experienced users find it difficult to determine their position or find a path.

Most users find that they can reduce some of the cognitive burden of orientation by aligning the map with their direction of view, perhaps in association with a compass. A paper map can be rotated by hand, and a computer-generated display can be rotated with a simple coordinate transformation. The latter may be of further help if it can model the landform in perspective from an arbitrary position. Still, users are left with two independent views: that of the symbolic map and the raw visual scene. This problem is magnified when the image of the scene is being viewed remotely.

Thus, a need exists for a way to present a remote user with a single view, incorporating both the visual scene, and the information typically provided by a map, as well as other information.

SUMMARY OF THE INVENTION

Briefly, the present invention satisfies the need to improve upon the use of maps by a remote viewer of a scene by providing a method and system for the viewer to identify an area of interest on a remote image of a scene, and augmenting the image with information about the area identified.

In accordance with the above, it is an object of the present invention to provide a way to augment an image of a scene with information about the scene.

The present invention provides, in a first aspect, a method of augmenting an image of a scene. The method comprises a first computing unit obtaining a digital image of a scene, acquiring a digital elevation model of the scene, and registering the digital image with the digital elevation model to create a registered digital image. The digital elevation model comprises data for creating a three-dimensional model of the scene in two dimensions. The method further comprises the first computing unit providing the registered digital image to a second computing unit coupled to the first computing unit by a communication network, and augmenting the registered digital image with at least some information about the scene in response to input from the second computing unit.

The present invention further provides, in second and third aspects, system and program products for implementing the method of the first aspect.

These, and other objects, features and advantages of this invention will become apparent from the following detailed description of the various aspects of the invention taken in conjunction with the accompanying drawings.

BEST MODE FOR CARRYING OUT THE INVENTION

The present invention provides a user at one computing unit with a real-world image of a scene that has been registered with an elevation model of that scene at another computing unit and provided over a communications network. When the user identifies an area or point of interest in the image, the coordinates are reverse projected onto the elevation model to determine what area or point of interest was identified. Once the area or point of interest is determined, an indication of one or more known features at that location can be overlaid on the image the user sees, such as, for example, symbolic, graphic or textual cartographic data.

Figure 1:
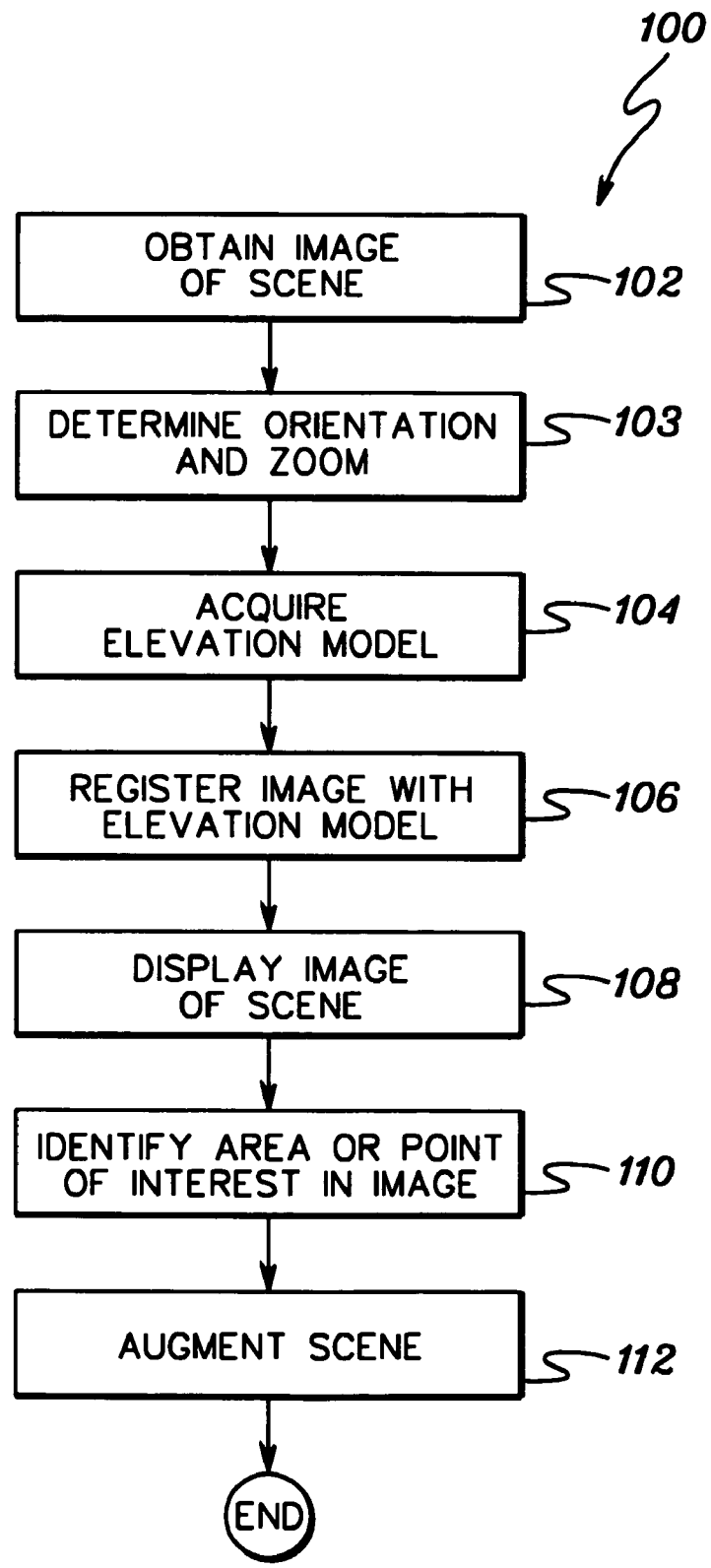
FIG. 1 is a flow diagram of one example of the logic involved in implementing a method for augmenting an image of a scene, in accordance with the present invention.

FIG. 1 is a flow diagram 100 showing one example of the logic used to implement a method of augmenting an image of a scene, in accordance with the present invention. A digital image of a scene is obtained (STEP 102). The image is obtained through the use of an image capturing device, such as, for example, a camera or a camcorder. Further, the image capturing device could be fixed in place with a limited view or mobile. The image can be obtained by the physical presence of a person operating the image capturing device, or the image capturing device can be remotely operated (e.g., over a computer network). Further, the image of the scene could be live or pre-existing. The digital format of the image can be obtained with a digital image capturing device, or a combination of an analog image capturing device with a digitizing device (e.g., a scanner).

The orientation and zoom factor of the image capturing device used to capture the image of the scene is determined (STEP 103). The orientation comprises the field position, horizontal look direction and vertical look direction, which can be determined by, for example, the use of a global positioning device in conjunction with a digital compass and a digital inclinometer, respectively. The zoom factor is typically supplied by observing the image capturing device, or supplied directly by the image capturing device itself. Where zoom is either not a feature of the image capturing device, or the zoom information cannot be read by a computing unit, the known shortest and longest focal lengths for the image capturing device can be used instead of a zoom factor. Although a digital compass and inclinometer is preferred, it will be understood that an analog compass and separate or combined analog inclinometer could be used, and the data input manually into a computing unit. As one skilled in the art will know, combination digital compass and inclinometers are currently available, physically look much like a global positioning system receiver, and are commonly used by surveyors. A digital compass and inclinometer provides a compass direction and tilt angle (tilt with respect to an ellipsoid—an idealized surface of the earth). For a particular point on the ellipsoid, the surface of earth is assumed to be flat because of the size thereof. The ellipsoid surface generally corresponds to sea level.

A digital compass and inclinometer is preferred, so that the information can be provided directly to a computing unit for processing. A global positioning system ("GPS") receiver gives an absolute position in a coordinate system, based on signals received from satellites orbiting the earth. Examples of coordinate systems that are used are latitude and longitude, and universal transverse mercator (UTM). UTM projects a small part of the earth's surface on to a flat surface, making it easier to work with. The orientation can only be provided by such devices if they are fixed with respect to the image capturing device, usually in close proximity to improve accuracy and avoid having to adjust for location offset. Although a GPS receiver is preferred, it will be understood that the orientation could also be determined manually using traditional land survey techniques, and input into a computing unit. Information on traditional land survey techniques can be found, for example, in "Surveying," by A. Bannister et al., $6^{th}$ Ed., J. Wiley, 1992 (ISBN 0470218452).

A digital elevation model for the scene is acquired (STEP 104). As one skilled in the art will know, an elevation model comprises three-dimensional data about a scene that is used to create a three-dimensional perspective model of the scene in two dimensions. Ordinarily, the elevation model data is in digital format for computing unit processing, and is retrieved from long-term storage (e.g., a hard disk) into temporary storage (e.g., random access memory).

The image of the scene is then registered with the elevation model (STEP 106). Since both the image and the elevation model are two-dimensional in x-y space, the term "registering" refers to effectively lining the image and elevation model up such that the same point has the same coordinates in both, allowing for some inherent alignment error. The digital elevation model is rendered with respect to the user's position, horizontal look direction, and vertical look direction, producing a 2-dimensional perspective image occupying (and hence registered to) the same coordinate space as the image of a scene. Rendering is currently accomplished with commercially available software discussed below, but could also be performed through the implementation of widely known rendering algorithms. See, e.g., "Fundamentals of Interactive Computer Graphics," Foley et al., 1984, pp. 290–295, Addison-Wesley Pub. Co., ISBN 0201144689, which is hereby incorporated by reference.

The registered image of the scene is rendered on a display (STEP 108). The registered image appears to a user to be identical to the stand-alone image of the scene. It is only for the next step that the registration has significance. Any type of display could be used, such as, for example, a common CRT computer display, or a flat screen display, such as that found on a notebook computer. Other types of displays could also be used, such as, for example, plasma or LCD displays. In addition, a touch-screen display could be used that would facilitate the next step.

An area or point of interest in the displayed image is then identified by a user (STEP 110). The identification can be done in a number of ways. For example, as indicated above, if a touch-screen display were used, the user could simply touch the point of interest on the image with, for example, a stylus or even their finger. As another example, a pointing device can be used by the user to indicate the area or point of interest in the image of the scene. Examples of such pointing devices include a mouse, an electronic pen or stylus, and even the arrow keys of a computer keyboard in conjunction with the enter key. As another example, the pointing device could be a stick-type pointing device or touch pad, both of which are often used in notebook computers.

Once the area or point of interest in the image is identified, the coordinates of the area or point of interest are compared to the same coordinates in the elevation model. The coordinates of the area or point of interest are determined by reverse projecting image coordinates to the coordinate system of a corresponding informational database (e.g., latitude/longitude or UTM). A feature database or other information regarding the scene is associated with various areas or points in the scene, and any features correlated to the coordinates determined are identified. Representations of those features, text or other information can then be overlaid on the image of the scene, thereby augmenting the same (STEP 112).

Figure 2:
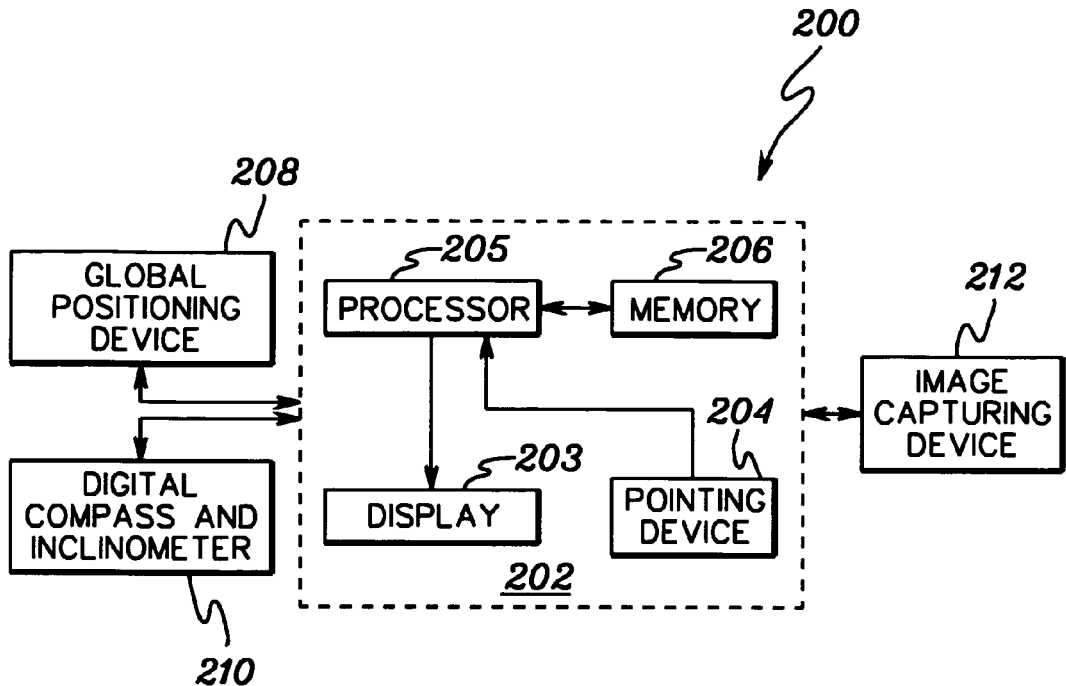
FIG. 2 is a block diagram of one example of a system implementing the method of the present invention.

FIG. 2 is a block diagram of one example of a system 200 for augmenting an image of a scene, in accordance with the present invention. System 200 comprises a computing unit 202, comprising, for example, display 203, pointing device 204, processor 205, and memory 206. Computing unit 202 is, for example, a notebook computer executing Microsoft WINDOWS, running on the Intel PC architecture (e.g., a SONY VAIO notebook computer). Display 203 is, for example, an SVGA active matrix display, while pointing device 204 is, for example, a touch-pad, processor 205 is, for example, a PENTIUM III 600 MHz mobile processor, and memory 206 comprises, for example, 128 MB of RAM and a 10 GB hard drive. It will be understood that other computing units, displays and pointing devices could be used. For example, display 203 could be a cathode ray tube based monitor, and pointing device 204 could be a mouse or a stick-type pointing device.

System 200 further comprises a GPS receiver 208 and a combined digital compass and inclinometer 210. The GPS receiver provides a field position of an image capturing device 212, while the digital compass and inclinometer 210 provide a horizontal look direction for the image capturing device and a vertical look direction therefor, respectively. A global positioning device is preferred over other traditional field survey methods of determining field position, due to its high portability and reception of satellite signals, and its accuracy to within 1 meter of true ground position in real time. One example of a global positioning device is a Trimble Pro-XR GPS/Beacon receiver available from Trimble Navigation, Sunnyvale, Calif. The Pro-XR receiver applies land or satellite-based correction (differential) signals to GPS time signals, providing position coordinates accurate within 1 meter of true ground position. Positions are transmitted to the host computer as ASCII characters formatted in a standard GPS data format (e.g., RINEX and others).

Although GPS receivers are more accurate than other methods of determining field position, a certain level of error still exists. Error in the calculation of a GPS position is largely due to the number of satellites seen by the receiver, the current geometry of their orbital positions, and the intentional error built into their broadcast time signals (selective availability). By adding a correction (differential) signal from a land-based beacon or a satellite subscription service, the receiver can compensate for much of this error. Land-based differential signals are currently broadcast free of charge only in a limited number of locations. There are also fee-based satellite differential signals that can be acquired over many more locations, for example, from Omnistar, Inc., Houston, Tex.

A digital magnetic compass measures angles relative to, in this case, the image capturing device's magnetic meridian. When calibrated, a surveyor-grade digital compass is accurate to within 0.3 degrees of true azimuth (relative to geodetic or true north). Although a surveyor's electronic total station can provide higher resolution bearings, daytime acquisition of a true north bearing requires the user to first take a sun-shot, a rather demanding technical operation that establishes a meridian (a north-south line) through the viewpoint (i.e., the location of the image capturing device). A digital inclinometer determines tilt angle with respect to an ellipsoid (or a vertical look direction) of the image capturing device, and is accurate to within 0.1 degrees of the true vertical angle relative to the geoid (the local flat surface, orthogonal to the direction of the gravitational vector). One example of a combination digital compass and inclinometer is a Laser Technology Impulse Map Star, available from Laser Technology, Inc., Englewood, Colo.

Figure 3:
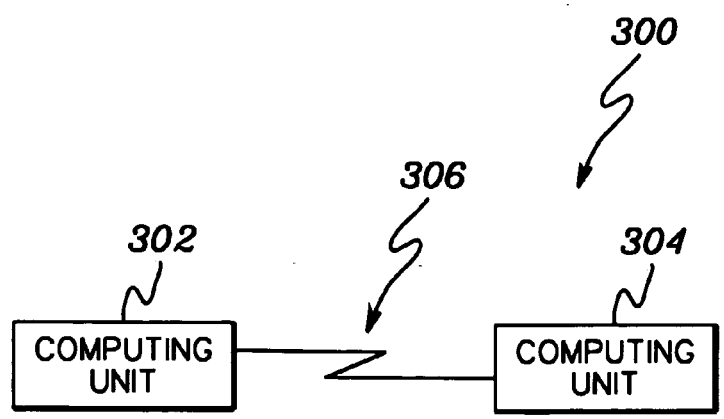
FIG. 3 is a block diagram of one example of a communications network useful for implementing the present invention.

One embodiment of a computing environment incorporating and using the capabilities of the present invention is described with reference to FIG. 3. A computing environment 300 includes, for instance, at least one computing unit 302 coupled to another at least one computing unit 304. In one example, computing unit 302 is a server taking the place of computing unit 202 in FIG. 2, while computing unit 304 is a client. Each unit includes, for example, one or more central processing units, memory and one or more input/output devices, as is well known in the art.

Computing unit 302 is based, for instance, on the Enterprise Systems Architecture (ESA)/390 offered by International Business Machines Corporation, Armonk, N.Y. One example of a computing unit based on ESA/390 is the 9672 Parallel Enterprise Server offered by International Business Machines Corporation. A suitable operating system is IBM's Multiple Virtual Storage (MVS) operating system. Alternatively, computing unit 302 is, for example, a Hewlett Packard system running HP-UX, a Unix derivative operating system.

Computing unit 304 is, for instance, a personal computer, such as a personal computer (PC) executing Microsoft WINDOWS, which runs on the Intel PC architecture.

Computing unit 302 is coupled to computing unit 104 via a standard connection 306, such as any type of communications network, wire or wireless connection, token ring or network connection, to name just a few examples. One example of a communications protocol used by one or more of these connections is TCP/IP.

The above-described computing environment and/or computing units are only offered as examples. The present invention can be incorporated and used with many types of computing units, computers, processors, nodes, systems, work stations and/or environments without departing from the spirit of the present invention. For example, one or more of the units may be based on the UNIX architecture. Additionally, while some of the embodiments described herein are discussed in relation to servers and clients, such embodiments are only examples. Other types of computing environments can benefit from the present invention and are thus, considered a part of the present invention.

Additionally, in various aspects of the present invention, the client need not be remote from the server. Various aspects of the invention are equally applicable to clients and servers running on the same physical machine, different physical machines or any combinations thereof.

Connection 306 may comprise, for example, a local area network or a global computer network such as the INTERNET which comprises a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages of information to a remote client computer system. The remote client computer system can then display the Web pages. Each resource (e.g., server or Web page) of the WWW is uniquely identifiable by a Uniform Resource Locator ("URL"). To view a specific Web page, a user computer system specifies the URL for that Web page in a request (e.g., a HyperText Transfer Protocol ("HTTP") request). The request is forwarded to the Web server that supports that Web page. When that Web server receives the request, it sends that Web page to the user computer system. When the user computer system receives that Web page, it typically displays the Web page using a browser. A browser is a special-purpose application program that effects the requesting of Web pages and the displaying of Web pages. A user computer system may utilize a browser such as Microsoft Internet Explorer® or Netscape Navigator®, for example.

Web pages are typically defined using HyperText Markup Language ("HTML"). HTML provides a standard set of tags that define how a Web page is to be displayed. When a user indicates to the browser to display a Web page, the browser sends a request to the server computer system to transfer to the builder or home-buyer computer system an HTML document that defines the Web page. When the requested HTML document is received by the user computer system, the browser displays the Web page as defined by the HTML document. The HTML document contains various tags that control the displaying of text, graphics, controls, and other features. The HTML document may also contain URLs of other Web pages available on that server computer system or other server computer systems.

Returning now to the previous discussion of error, since the surface of an ellipsoid is curved, an observer on its surface would find that the height of distant objects appear lower than close objects of the same height, beyond corrections for perspective scale reduction. Equation 1 below is a standard correction applied to elevations read from a staff with a surveyor's level in a geodetic survey. It is used here to lower the reported height of a sample in the elevation model as a function of its distance from the viewpoint. In Equation 1, z is the original elevation reported in the elevation model in meters, d is distance between the viewpoint and the object in kilometers, and $z_{corrected}$ is the adjusted elevation for the sample in meters. Equation 1 disregards error in the perceived height of an object due to atmospheric refraction.

$$z_{corrected} = z - (0.078d^2) \quad (1)$$

Figure 4:
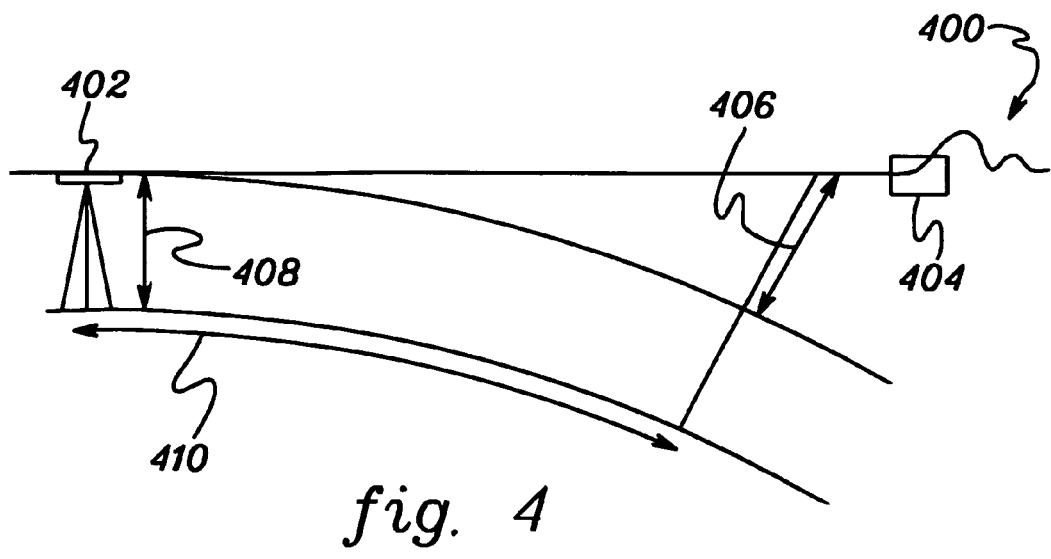
FIG. 4 depicts one example of an image capturing device viewing distant terrain, in accordance with the present invention.

Some scenes will represent views of distant terrain. For example, FIG. 4 depicts distant terrain 400 and fixed image capturing device 402. Using Equation 1, we find that an object 404 having an elevation 406 of 500 meters greater than the elevation 408 of the viewpoint (i.e., at the image capturing device) has a corrected elevation of 0 meters (equivalent to a flat horizon line) at a distance 410 of approximately 80 km from the viewpoint, disregarding atmospheric refraction. Using a 30 meter sampling resolution (for standard U.S. Geological Survey elevation models), we would need approximately 22,000,000 samples to cover a circle of this radius. Objects rising higher than 500 meters above the viewpoint will extend the viewshed boundary and the required elevation model coverage even further. As used herein, the term "viewshed" refers to the areas of the environment that can be seen from a given position and given look directions. Although data sets of this size can easily be stored on, for example, CD-ROM media, rendering a perspective model for a large viewshed may require prohibitive amounts of computing time with current processors. To perform rendering efficiently, the system preferably uses the differential sampling procedure described subsequently in detail.

Where the image capturing device is mobile across the elevation model coverage area, a digital elevation model at maximum ground resolution must be retained for the entire area. The model resolution must be independent of position so that any point in the environment may be selected as the viewpoint, representing the point of maximum elevation sampling resolution in a rendered model. Once an operating position is established, however, rendering operations can resample the elevation model at resolutions proportional to the distance of a surface patch from the viewpoint. Most users will probably show little interest in features that are close to disappearing below their horizon, yet some (like a driver on a highway) may want to know the name of the mountain range that just appeared above it. For this type of query, 10-meter resolution for an object 80 km away would map a little more than 6 samples to each pixel for a 22° field-of-view on a display 500 pixels wide. By reducing the elevation sampling resolution to 60 meters, a near one-to-one mapping of samples to pixels on the horizon is achieved.

Image capturing device 212 can be, for example, a camera or camcorder, preferably digital. Image capturing device 212 could be connected to computing unit 202 by, for example, an IEEE 1394 (or "firewire") connection. Where image capturing device 212 is a camcorder, it may include a preview screen that connects as display 203, taking the place of a separate display. However, the bigger the display, the better the image will generally be for this use; for example, it will make it easier to identify areas or points of interest with higher accuracy. Unfortunately, at the time of filing, only the largest and most expensive broadcast-quality video cameras provide digital information external to the video camera about focal length and field of view in a zoom operation. Where such information is not available, the system will use the known shortest and longest focal lengths for the camcorder.

Image capturing device 212 can also be connected to a server on a global computer network, providing imagery to computing units on the network through, for example, HTTP requests. Commercially available equipment that provides image capture and remote camera control through HTTP requests is available from, for example, Perceptual Robotics, Inc., Evanston, Ill. In this example, the application control software uses a web browser interface to control image acquisition. In one example, on the user's first visit to the camera web site, the browser downloads a default captured image of the scene as part of a camera control HTML page. The user changes the camera look directions by clicking on a point within the default image, by clicking on pan and tilt buttons on the HTML page, or by entering pan and tilt coordinates directly. The user can also select a new scale (zoom) factor by clicking a button. These requests are transmitted to the camera server which returns a new scene to the user's browser, reflecting the requested changes in the camera's orientation.

Memory 206 in computing unit 202 is used, in part, for storing one or more digital elevation models providing elevation data for surface rendering. For example, digital elevation models created by the New York State Department of Environmental Conservation could be used for locations in New York State, which sample elevations over an area of 7.5 minutes of longitude by 7.5 minutes of latitude at 10 meter intervals, registered to the universal transverse mercator (UTM) coordinate grid. As one skilled in the art will know, UTM is a projected (two-dimensional) coordinate system. Modern surveyor-grade GPS receivers project latitude and longitude to UTM coordinates. The digital elevation models created by New York State can be obtained over the Internet at no charge from the New York State GIS Data Sharing Cooperative (www.nysl.nysed.gov/gis/datacoop.htm). The digital elevation model is rendered from the viewpoint of the observer, given the user's position (provided by the GPS) and look directions (provided by the digital compass and digital inclinometer). Rendering is a mathematical transformation that converts three-dimensional world coordinates (e.g., latitude/longitude or UTM) to a two-dimensional perspective coordinate system centered on the user's viewpoint with non-uniform scale decreasing with distance from the viewpoint. If the user were to stand on a railroad bed and render the scene centered along the two tracks, image distances between tracks would decrease the farther the user looks down the tracks. Of course, the width of the track (represented in three-dimensional world coordinates) remains constant, regardless of the user's viewpoint.

Commercial three-dimensional rendering libraries are available that provide these transformations and allow the user to specify the focal length and field of view of the image capturing device 212. One example of such commercial three-dimensional rendering libraries is the Microsoft Direct3D rendering libraries, available from Microsoft, Redmond, Wash. Direct3D, like most 3D graphics rendering libraries, provides functions to reverse project image coordinates to world coordinates. However, a single two-dimensional pixel maps to a three-dimensional vector that passes through the horizontal and vertical coordinates of the pixel and lies orthogonal to the plane of the viewing screen. Preferably, computing unit 202 determines the selected coordinates by default along the vector by choosing the location in world coordinates that appears closest to the image capturing device in the perspective model. Other locations will be considered to be on hidden surfaces. If it is desired to choose different coordinates along the vector, a user is preferably given an option to do so. For example, using pointing device 204, a user could select a given area of interest in the registered image, and be provided on display 203 an ordered list of locations along the vector, sorted, for example, by increasing distance from the image capturing device.

In one embodiment, the interactive operation of an augmented scene begins when the user selects a theme for querying and display. Thematic operations are selected, for example, by selecting items in a menu system. For example, a hiker may elect to activate a campsite theme to symbolize campsites in the registered image.

Once the world coordinates of a selected pixel are identified, features in the current theme that occur at the same coordinates can be overlaid on the image. If one or more features are found, they can be selected for symbolization (e.g., with text, lines, shapes, graphics, etc.) or analysis. Preferably, the tolerance for coordinate matching can be altered to ease feature selection.

Figure 5:
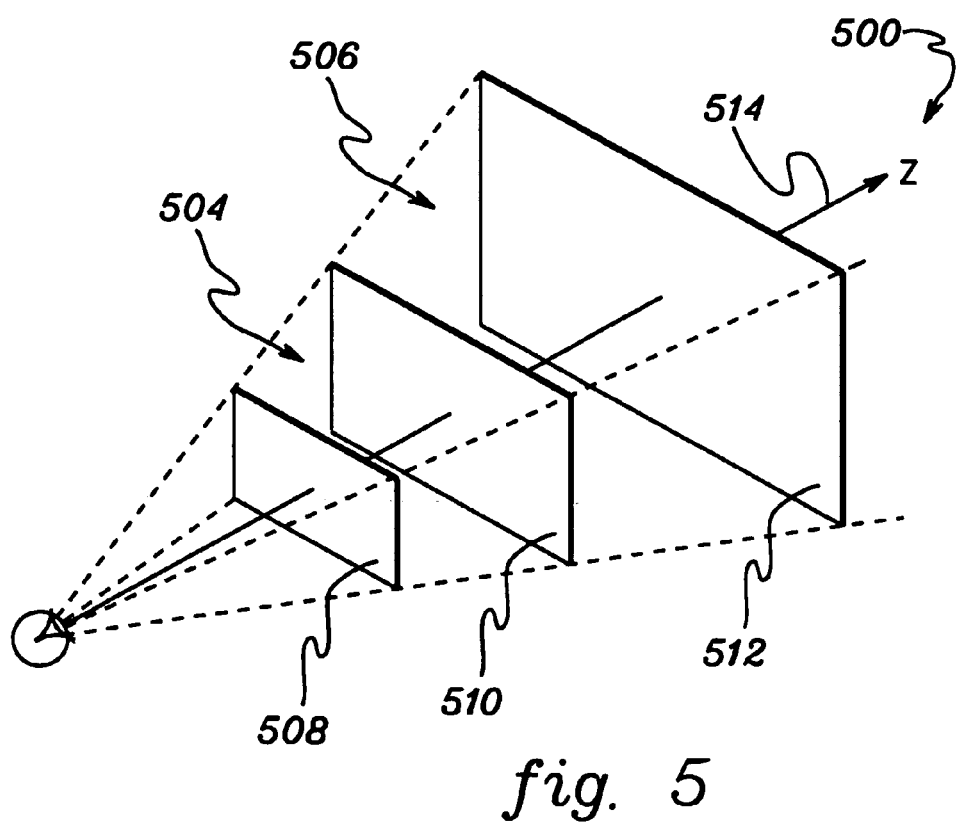
FIG. 5 depicts one example of multiple frustums from a single viewpoint for constructing an elevation model, in accordance with the present invention.
Figure 6:
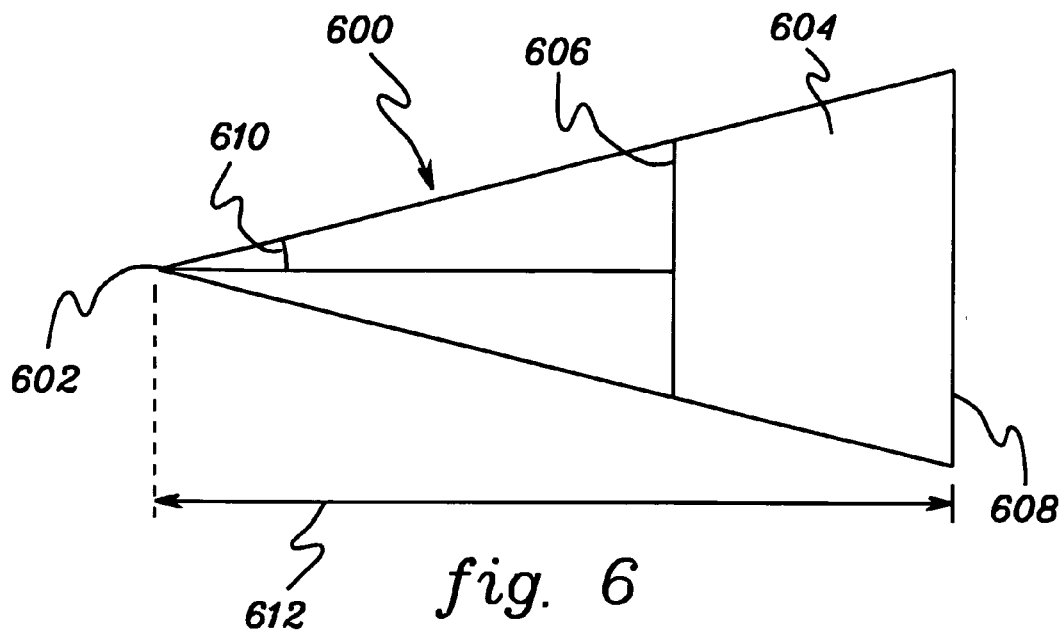
FIG. 6 depicts another example of a viewing frustum, in accordance with the present invention.

A procedure that applies differential resampling resolutions to surface rendering will now be described. Using front and back clipping planes to define the limits of a viewing frustum, the procedure allows for the construction of multiple frustums from a single viewpoint. FIG. 5 depicts a viewing frustum 500 from a viewpoint 502, comprising a near frustum 504 and a rear frustum 506. Starting at its respective front clipping plane (plane 508 for the near frustum, and plane 510 for the far frustum), each frustum resamples the elevation model at a constant resolution over its region. The depth of the back clipping plane (plane 510 for near frustum 504, and plane 512 for rear frustum 506) is set to the distance at which a one-to-one mapping occurs between surface patches and pixels. It is coplanar with the front of the next frustum, if one exists. Frustums are ordered along the Z axis 514 with decreasing resampling resolutions away from the viewpoint. Using an initial resampling resolution of 10 meters, a display with a 500-pixel width (typical for current camcorder swing-out LCD displays) would be able to map a ground scene 5000 meters across at its greatest depth without exceeding a 1-sample-per-pixel limit. FIG. 6 depicts such a viewing frustum 600, with a viewpoint 602 and frustum 604, with front plane 606 and back plane 608. Assuming that the half-angle θ (610) of the camera lens is 11°, Equation 2 below gives the depth 612 from the viewpoint BP=12,861 meters at which this limit is maintained:

$$BP = BP_{width}/2 \tan \theta, \quad (2)$$

where $BP_{width}$, the width of the back clipping plane 608, is set to 5000 meters.

Keeping each frustum at a constant depth of 12,861 meters, Equation 3 below gives the resampling resolution $R_{frustum}$=20 meters per pixel for the next frustum with BP=25,722 meters and the display width $D_{width}$=500 pixels, maintaining a one-to-one mapping on its back clipping plane.

$$R_{frustum} = 2BP \tan \theta / D_{width} \quad (3)$$

The furthest frustum is rendered first. Subsequent frustums are rendered independently, progressing toward the viewpoint, as opaque overlays on the previously rendered models. Since each frustum shares a common viewpoint, field-of-view, and focal length, their rendered images register with one another.

Figure 7:
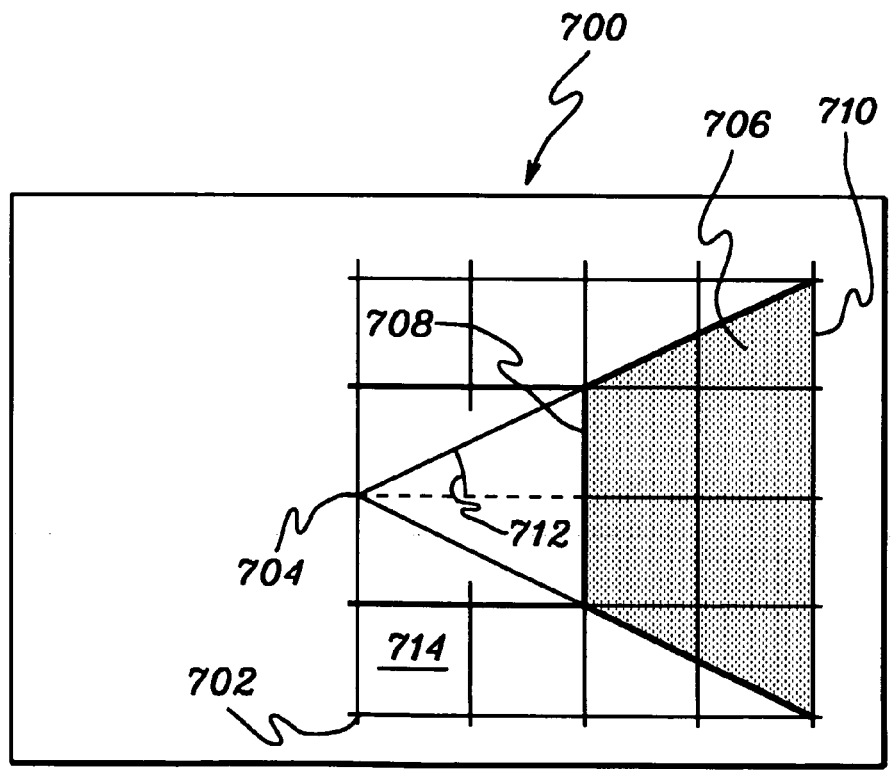
FIG. 7 depicts still another example of a viewing frustum, in accordance with the present invention.

FIG. 7 shows an imaging scene schematic 700 on a grid 702, with viewpoint 704, and frustum 706 with front plane 708 and back plane 710. The number of elevation samples N in a frustum with a constant sampling resolution is given by Equation 4:

$$N = (FP \tan \theta + BP \tan \theta)(BP - FP)/S_{area}, \quad (4)$$

where θ is the half-angle 712 of the camera lens field-of-view, FP is the ground-unit distance of the viewpoint to the front clipping plane, BP is the ground-unit distance of the viewpoint to the back clipping plane, and $S_{area}$ is the ground-unit area covered by a sample grid cell (e.g., grid cell 714).

If the viewpoint is on the front clipping plane, Equation 4 simplifies to:

$$N = BP^2 \tan \theta / S_{area}. \quad (5)$$

It is expected that the rendering time for a scene will be proportional to the total number of elevation samples selected for all frustums. However, changes in resampling resolution at frustum boundaries will produce discontinuities across the rendered surface models. It is expected that features on or near frustum boundaries will require longer selection times than other features.

Positional accuracy in an augmented scene is most critical for areas in the viewshed nearest the image capturing device. If the user wants to see an image extending from the viewpoint to the edge of the viewshed, positional error will be most visible in objects projected onto the scene nearest the viewpoint. As objects recede from the viewer, perspective scale reduction will continue to decrease the distances between their visible representation in the captured image and their projected locations in the perspective model.

In contrast to positional error, error in the look direction angles becomes more critical as distance increases away from the image capturing device. At a distance of 1 kilometer, a 1° error in either look direction will offset a feature approximately 17.5 meters in world coordinates from its true position. At a distance of 10 kilometers, the error will be approximately 175 meters. Some misalignment between the image and model may be due to inaccurate estimation or implementation of the system lens geometry parameters. Any measurement bias can generally be accounted for by compensating with the lens modeling parameters, i.e., the focal length and field of view.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

What is claimed is:

1. A method of augmenting an image of a scene, comprising:
    obtaining by a first computing unit a digital image of a scene;
    acquiring by the first computing unit a digital elevation model of the scene, wherein the digital elevation model comprises data for creating a three-dimensional perspective model of the scene in two dimensions;
    registering by the first computing unit the digital image with the digital elevation model to create a registered digital image;
    providing the registered digital image from the first computing unit to a second computing unit coupled to the first computing unit by a communication network; and
    augmenting the registered digital image provided to the second computing unit with at least some information about the scene in response to input from the second computing unit.

2. The method of claim 1, wherein obtaining the digital image comprises obtaining an image of the scene in real time with a fixed image capturing device.

3. The method of claim 1, wherein obtaining the digital image comprises obtaining an image of the scene in real time with a mobile image capturing device.

4. The method of claim 1, wherein obtaining the digital image comprises obtaining a preexisting image of the scene.

5. The method of claim 1, wherein the obtaining comprises obtaining an analog image and digitizing the analog image.

6. The method of claim 1, wherein the acquiring comprises acquiring a preexisting digital elevation model.

7. The method of claim 1, wherein the information comprises a location of at least one above-ground feature within the scene.

8. The method of claim 1, wherein the information comprises a location of at least one underground feature within the scene.

9. The method of claim 1, wherein the obtaining comprises obtaining an image of the scene from an image-capturing device, the method further comprising determining an orientation and a zoom factor for the image-capturing device.

10. The method of claim 9, wherein the image-capturing device is fixed, and wherein the determining comprises reading positional and zoom factor information from the image-capturing device.

11. The method of claim 10, wherein the positional information comprises latitude, longitude and elevation above ground.

12. The method of claim 9, wherein the image-capturing device is mobile, and wherein the determining comprises reading a zoom factor from the image-capturing device and obtaining the orientation from equipment positionally fixed relative to the image-capturing device.

13. The method of claim 12, wherein the equipment comprises a global positioning system, a digital compass and a digital inclinometer.

14. The method of claim 1, further comprising rendering the registered digital image at the second computing unit to produce a rendered image, wherein the augmenting comprises:
identifying at the second computing unit a point of interest in the rendered image;
providing the identified point of interest from the second computing unit to the first computing unit;
reverse projecting the identical point of interest at the first computing unit to determine coordinates therefor; and
accessing the information at the first computing unit corresponding to the coordinates.

15. The method of claim 14, wherein the augmenting further comprises overlaying the information corresponding to the coordinates on the registered digital image.

16. The method of claim 15, wherein the information comprises textual cartographic data.

17. The method of claim 15, wherein the information comprises graphical cartographic data.

18. The method of claim 1, further comprising rendering the registered digital image at the second computing unit to create a displayed image, wherein the input comprises pointing by a user to at least one area of the displayed image.

19. The method of claim 1, wherein the communications network comprises a global computer network.

20. A system for augmenting an image of a scene, comprising:
a computing unit programmable for:
obtaining a digital image of a scene;
acquiring a digital elevation model of the scene, wherein the digital elevation model comprises data for creating a three-dimensional perspective model of the scene in two dimensions;
registering the digital image with the digital elevation model to create a registered digital image;
providing the registered digital image over a communications network; and
augmenting the registered digital image with at least some of information about the scene in response to input.

21. The system of claim 20, further comprising a fixed image capturing device coupled to the computing unit for capturing an image of the scene in real time.

22. The system of claim 20, further comprising a mobile image capturing device coupled to the computing unit for capturing an image of the scene in real time.

23. The system of claim 20, further comprising a scanner for digitizing an analog image of the scene.

24. The system of claim 20, wherein the acquiring comprises acquiring a preexisting digital elevation model.

25. The system of claim 20, wherein the information comprises a location of at least one above-ground feature within the scene.

26. The system of claim 20, wherein the information comprises a location of at least one underground feature within the scene.

27. The system of claim 20, further comprising an image-capturing device, the computing unit determining an orientation and a zoom factor for the image-capturing device.

28. The system of claim 27, wherein the image-capturing device is fixed, and wherein the determining comprises reading positional and zoom factor information from the image-capturing device.

29. The system of claim 28, wherein the positional information comprises latitude, longitude and elevation above ground.

30. The system of claim 27, further comprising orientation equipment positionally fixed relative to the image-capturing device, wherein the image-capturing device is mobile, and wherein the determining comprises reading a zoom factor from the image-capturing device.

31. The system of claim 30, wherein the orientation equipment comprises a global positioning system, a digital compass and a digital inclinometer.

32. The system of claim 20, further comprising another computing unit coupled to the computing unit via the communication network, the another computing unit comprising: a display for rendering the registered digital image to produce a rendered image; and a pointing device for identifying a point of interest in the rendered image; wherein the augmenting comprises reverse projecting the identified point of interest to determine coordinates therefor, and accessing the information corresponding to the coordinates.

33. The system of claim 32, wherein the augmenting further comprises overlaying the information corresponding to the coordinates on the rendered image.

34. The system of claim 33, wherein the information comprises textual cartographic data.

35. The system of claim 33, wherein the information comprises graphical cartographic data.

36. The system of claim 32, wherein the communication network comprises a global computer network.

37. At least one program storage device readable by a machine, tangibly embodying at least one program of instruction executable by the machine to perform a method of augmenting an image of a scene, the method comprising:

obtaining by a first computing unit a digital image of a scene;

acquiring by the first computing unit a digital elevation model of the scene, wherein the digital elevation model comprises data for creating a three-dimensional perspective model of the scene in two dimensions;

registering by the first computing unit the digital image with the digital elevation model to create a registered digital image;

providing the registered digital image from the first computing unit to second computing unit coupled to the first computing unit by a communications network; and augmenting the registered digital image provided to the second computing unit with at least some of information about the scene in response to input from the second computing unit.

38. The at least one program storage device of claim 37, wherein obtaining the digital image comprises obtaining a digital image of the scene in real time from a fixed digital image capturing device.

39. The at least one program storage device of claim 37, wherein obtaining the digital image comprises obtaining a digital image of the scene in real time from a mobile digital image capturing device.

40. The at least one program storage device of claim 37, wherein obtaining the digital image comprises obtaining a preexisting digital image of the scene.

41. The at least one program storage device of claim 37, wherein acquiring the digital elevation model comprises acquiring a preexisting digital elevation model.

42. The at least one program storage device of claim 37, wherein the information comprises a location of at least one above-ground feature within the scene.

43. The at least one program storage device of claim 37, wherein the information comprises a location of at least one underground feature within the scene.

44. The at least one program storage device of claim 37, wherein the obtaining comprises obtaining the digital image from a digital image-capturing device, the method further comprising determining an orientation and a zoom factor for the digital image-capturing device.

45. The at least one program storage device of claim 44, wherein the digital image-capturing device is fixed, and wherein the determining comprises reading positional and zoom factor information from the digital image-capturing device.

46. The at least one program storage device of claim 45, wherein the positional information comprises latitude, longitude and elevation above ground.

47. The at least one program storage device of claim 44, wherein the digital image-capturing device is mobile, and wherein the determining comprises reading a zoom factor from the digital image-capturing device and obtaining the orientation from equipment positionally fixed relative to the digital image-capturing device.

48. The at least one program storage device of claim 47, wherein the equipment comprises a global positioning system, a digital compass and a digital inclinometer.

49. The at least one program storage device of claim 37, further comprising rendering the registered digital image at the second computing unit to produce a rendering image, wherein the augmenting comprises:

identifying at the second computing unit a point of interest in the rendered image;

providing the identified point of interest from the second computing unit to the first computing unit;

reverse projecting the identified point of interest at the first computing unit to determine coordinates therefor; and accessing the information at the first computing unit corresponding to the coordinates.

50. The at least one program storage device of claim 49, wherein the augmenting further comprises overlaying the information corresponding to the coordinates on the registered digital image.

51. The at least one program storage device of claim 50, wherein the information comprises textual cartographic data.

52. The at least one program storage device of claim 50, wherein the information comprises graphical cartographic data.

53. The at least one program storage device of claim 37, wherein the communications network comprise a global computer network.

54. A system of augmenting an image of a scene, comprising:

means for obtaining by a first computing unit a digital image of a scene;

means for acquiring by the first computing unit a digital elevation model of the scene, wherein the digital elevation comprises data for creating a three-dimensional perspective model of the scene in two dimensions;

means for registering by the first computing unit the digital image with the digital elevation model to create a registered digital image;

means for providing the registered digital image from the first computing unit to a second computing unit coupled to the first computing unit by a communications network; and means for augmenting the registered digital image provided to the second computing unit with at least some information about the scene in response to input from the second computing unit.

* * * * *

UNITED STATES PATENT AND TRADEMARK OFFICE
CERTIFICATE OF CORRECTION

PATENT NO. : 6,930,715 B1
DATED : August 16, 2005
INVENTOR(S) : Mower

It is certified that error appears in the above-identified patent and that said Letters Patent is hereby corrected as shown below:

Title page,
Item [57], ABSTRACT,
Line 7, delete the following wording: "based on data corresponding".

Column 1,
Line 64, insert the word -- perspective -- after the words "three-dimensional".

Column 12,
Line 10, delete the word "of" at the beginning of the line.

Column 13,
Line 14, delete the word "of" after the word "some".

Signed and Sealed this

Eighth Day of November, 2005

JON W. DUDAS
*Director of the United States Patent and Trademark Office*